United States Patent
Dimou et al.

(10) Patent No.: US 9,451,515 B2
(45) Date of Patent: Sep. 20, 2016

(54) METHODS AND APPARATUS FOR NEIGHBOR CELL RANGE EXTENSION

(75) Inventors: Konstantinos Dimou, Stockholm (SE); Matthias Kamuf, Lund (SE); Bengt Lindoff, Bjärred (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 835 days.

(21) Appl. No.: 13/457,237

(22) Filed: Apr. 26, 2012

(65) Prior Publication Data

US 2012/0282864 A1 Nov. 8, 2012

Related U.S. Application Data

(60) Provisional application No. 61/483,398, filed on May 6, 2011.

(51) Int. Cl.
*H04W 24/10* (2009.01)
*H04W 36/22* (2009.01)
*H04W 16/08* (2009.01)

(52) U.S. Cl.
CPC ............ *H04W 36/22* (2013.01); *H04W 16/08* (2013.01)

(58) Field of Classification Search
CPC ... H04W 24/00; H04W 36/04; H04W 24/10; H04W 36/00
USPC ......... 370/328, 329; 455/525, 526, 436, 437
See application file for complete search history.

(56) References Cited

U.S. PATENT DOCUMENTS

| | | | |
|---|---|---|---|
| 5,740,166 A * | 4/1998 | Ekemark et al. | 370/331 |
| 8,483,745 B2 * | 7/2013 | Furueda et al. | 455/525 |
| 2004/0131029 A1 * | 7/2004 | Tobe et al. | 370/331 |
| 2007/0275722 A1 | 11/2007 | Thorson et al. | |
| 2010/0223522 A1 * | 9/2010 | Duggan | H04L 1/0021 714/748 |
| 2010/0272018 A1 * | 10/2010 | Furueda et al. | 370/328 |
| 2011/0151867 A1 | 6/2011 | Hirano et al. | |
| 2011/0177834 A1 * | 7/2011 | Shin | H04J 11/0033 455/501 |
| 2011/0194513 A1 * | 8/2011 | Kim | H04W 52/244 370/329 |
| 2011/0250891 A1 * | 10/2011 | Zou et al. | 455/437 |
| 2011/0281587 A1 * | 11/2011 | Jokinen et al. | 455/437 |
| 2011/0286346 A1 * | 11/2011 | Barbieri | H04B 17/327 370/252 |

(Continued)

FOREIGN PATENT DOCUMENTS

JP 2010-258845 A 11/2010
WO 00/28758 A1 5/2000

(Continued)

OTHER PUBLICATIONS

EPO, Int'l Search Report in PCT/EP2012/058061, Jun. 15, 2012.

(Continued)

*Primary Examiner* — Edan Orgad
*Assistant Examiner* — Emmanuel Maglo
(74) *Attorney, Agent, or Firm* — Patent Portfolio Builders PLLC (57) ABSTRACT

A user equipment (UE) located in an extended-range area of a neighbor base station cell in a communication network, such as a low-power cell in a heterogeneous network, can inform its serving base station, such as a macro cell overlying the low-power cell, of the UE's capability of canceling interference from other cells' transmissions. That capability information enables the serving cell to decide based on more information whether range extension of the neighbor cell is beneficial for a number of UEs, and can result in more efficient radio resource utilization.

21 Claims, 6 Drawing Sheets

(56) References Cited

U.S. PATENT DOCUMENTS

| | | | |
|---|---|---|---|
| 2011/0305195 A1* | 12/2011 | Forck et al. | 370/328 |
| 2012/0069756 A1* | 3/2012 | Ji | H04W 36/0016 |
| | | | 370/252 |
| 2012/0127949 A1* | 5/2012 | Yoshimoto et al. | 370/329 |
| 2012/0250531 A1* | 10/2012 | Patil | H04W 8/005 |
| | | | 370/252 |

FOREIGN PATENT DOCUMENTS

| | | |
|---|---|---|
| WO | 2010/032351 A1 | 3/2010 |
| WO | 2011/050338 A1 | 4/2011 |
| WO | 2011/126932 A1 | 10/2011 |
| WO | 2012/100822 A1 | 8/2012 |
| WO | 2012/154100 A1 | 11/2012 |

OTHER PUBLICATIONS

EPO, Written Opinion in PCT/EP2012/058061, Jun. 15, 2012.

QUALCOMM Incorporated, Enabling Communication in Harsh Interference Scenarios, 3GPP Tdoc R4-102673, Jun. 28, 2010, pp. 1-12, 3GPP TSG RAN WG4 AH#10-03, Bratislava, Slovakia.

Nokia Siemens Networks et al, Discussion of Pico Node Range Extension Benefits, 3GPP Tdoc R1-105552, Oct. 11, 2010, pp. 1-6, 3GPP TSG RAN WG1 Meeting #62-bis, Xi'an, CN.

Sharp, Problems Associated with Using a Constant CSG Offset when Performing Reselection Ranking, 3GPP Tdoc R2-085107, Sep. 29, 2008, pp. 1-8, 3GPP TSG RAN WG2, Meeting #63-bis, Prague, CZ.

3GPP Technical Specification 36.331, V10.0.0, Technical Specification Group Radio Access Network; Evolved Universal Terrestrial Radio Access (E-UTRA); Radio Resource Control (RRC); Protocol specification (Release 10), Dec. 2010.

3GPP Technical Specification 36.423, V10.0.0, Technical Specification Group Radio Access Network; Evolved Universal Terrestrial Radio Access Network (E-UTRAN); X2 application protocol (X2AP) (Release 10), Dec. 2010.

3GPP Technical Specification 36.211, V9.0.0, Technical Specification Group Radio Access Network; Evolved Universal Terrestrial Radio Access (E-UTRA); Physical Channels and Modulation (Release 9), Dec. 2009.

Official Action in related Russian Patent Application No. 2013154100, dated Apr. 13, 2016 (US 2010/0272018 cited Apr. 16, 2016 & WO 00/28758 cited Feb. 18, 2012).

Office Action in corresponding Chilean Application No. 2013/003181 dated Jan. 5, 2016. (All references previously disclosed in IDS submitted Feb. 18, 2012.)

Japanese Office Action in related Japanese Application No. 2014-508790, mailed Feb. 15, 2016.

* cited by examiner

METHODS AND APPARATUS FOR NEIGHBOR CELL RANGE EXTENSION

This application claims the benefit of the filing date of U.S. Provisional Patent Application No. 61/483,398 that was filed on May 6, 2011, and that is incorporated here by reference.

TECHNICAL FIELD

This invention relates to cellular radio communication networks and more particularly to cell control in such networks.

BACKGROUND

Recent and predicted exponentially increasing demand for higher data rates in cellular radio communication networks sets new challenges to wireless network operators and equipment vendors. A question for operators is how to evolve their existing cellular networks in cost- and time-efficient manners so as to meet the demand for higher data rates. Network operators can choose among a number of possible approaches, including increasing the density of their existing base stations, increasing cooperation among base stations, and deploying smaller base stations in areas where high data rates are needed within a grid, or layer, of larger, or "macro", base stations.

The last option can be called a heterogeneous network or heterogeneous network (HetNet) deployment. The network layer including the larger base stations can be called the macro layer, and the network layer including the smaller base stations can be called a "micro" or "pica" or "femto" layer. For example, the width of a macrocell can be greater than about two kilometers, the width of a microcell can be less than about two kilometers, the width of a picocell can be less than about two hundred meters, and the width of a femtocell can be a few dozen meters, but the artisan will understand that different widths in these ranges can be used. Thus, a HetNet in general has a mixture of cells, or base stations, of differently sized and overlapping coverage areas.

Improved support for heterogeneous cellular communication network operations is part of the ongoing specification of a Long Term Evolution (LTE) communication system by the Third Generation Partnership Project (3GPP) in its Release 10 Technical Specifications (TS) and in other upcoming Releases. 3GPP technical specifications for LTE networks can be seen as an evolution of the technical specifications for current wideband code division multiple access (WCDMA) networks. An LTE network is sometimes also called an Evolved Universal Terrestrial Radio Access (E-UTRA) Network (E-UTRAN).

Figure 1:
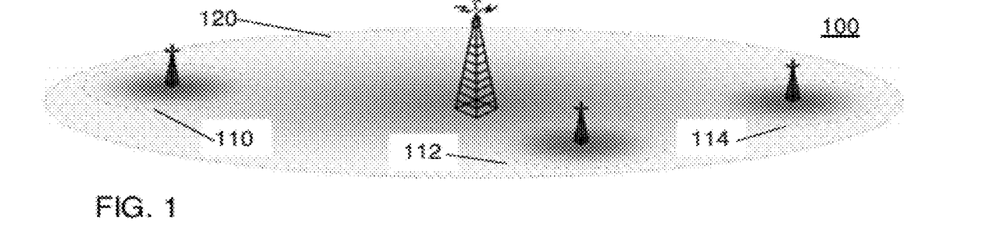
FIG. 1 depicts an example of a heterogeneous communication network.

FIG. 1 depicts an example of a HetNet 100 that includes three non-overlapping micro/pico/femto cells 110, 112, 114 deployed within the coverage area of a macro cell 120. It will be understood that the network 100 typically includes more than one macro cell 120, each of which can have zero, one, or more micro/pico/femto cells. In general, there is a significant difference in transmitted output power between a macro cell (e.g., +46 dBm) and a micro/pico/femto cell (e.g., less than +30 dBm). Examples of micro/pico/femto cells and similar low-power nodes in HetNets are home base stations and relay nodes. Base stations can also be called radio access network (RAN) nodes.

Building a denser layer of macro base stations and increasing cooperation between them can in principle meet current and future demand for higher data rates, but doing so is not necessarily either cost- or time-efficient because of the costs and delays involved in installation of macro base stations, especially in urban areas. As a result, deploying small, low-power base stations within an existing macro layer can be a more appealing option for a network operator, since micro/pico/femto base stations can be expected to be cheaper than macro base stations and the time needed to deploy them can be expected to be shorter.

Nevertheless, a dense deployment of low-power base stations can lead to a significantly higher amount of signaling overhead, with resulting reduced network capacity, due to more frequent cell-to-cell handovers of moving user equipments (UEs), which in general can be any type of wireless device or terminal, such as a telephone, laptop or tablet computer, a modem, a router, etc. The macro layer of a network, whether a HetNet or a homogeneous network, can serve UEs moving at high speed, and can also serve wider areas where the demand for high data rates is less. In a HetNet deployment, the smaller base stations can serve areas having a higher density of users requiring high data rates. Such areas are sometimes called "hotspots".

As noted above, one goal of the low-power RAN nodes in a HetNet is to absorb as many users as possible from the macro layer, thereby reducing the load on the macro layer and enabling higher data rates in both the macro and micro/pico/femto layers. In addition, a UE can generally be expected to have better radio performance, especially in the uplink (UL) from the UE to the base station, when the UE is connected to a micro/pico/femto cell since the UE is likely to be closer to the small base station.

Two techniques that are used for enhancing cellular networks are extending the communication range of a RAN node by using cell-specific cell-selection offsets, and increasing the transmit power of a RAN node and simultaneously setting appropriate UL power control target values for UEs connected to RAN nodes. These techniques can be used in homogeneous network and HetNet deployments, but both techniques have a drawback in that interference in the downlink (DL) control channels from base stations to UEs increases. Since DL control channels may be transmitted over the whole network bandwidth, the usual inter-cell interference coordination (ICIC) mechanisms specified in 3GPP Releases 8 and 9 cannot be applied to them.

With ICIC techniques according to 3GPP Release 10 specifications, radio resources on a carrier are shared by coordinating transmissions between neighboring cells. In a HetNet deployment, for example, certain radio resources are allocated to a macro cell during certain time periods, thereby enabling remaining radio resources to be used by underlying micro/pico/femto cell(s) without interference from the macro cell. This kind of resource sharing can change over time to accommodate different traffic demands and traffic situations between cells or across network layers, and can be more or less dynamic, depending on the implementation of the interface between the cells, or network nodes.

In an LTE network, for example, base stations, or evolved NodeBs (eNBs), can communicate with each other via an X2 interface, and so an eNB can readily inform other eNBs that it will reduce its transmit power on certain radio resources. Messaging according to the X2 protocol is specified in 3GPP TS 36.423 v10.0.0, Evolved Universal Terrestrial Radio Access Network (E-UTRAN); X2 application protocol (X2AP) (Release 10) (December 2010) and other specifications. Time synchronization of the eNBs is required to ensure that ICIC works efficiently, and this is particularly important for time-domain-based ICIC schemes, in which radio resources are shared in time on the same carrier.

A technique that has been investigated in 3GPP as an evolved ICIC mechanism, especially for the DL physical layer control channels, is the use of almost blank subframes (ABS). For example, a HetNet can use ABS for open-access micro/pico/femto eNBs that are closed subscriber group (CSG) home eNBs (HeNBs). With ABS in a HetNet, the macro layer is muted so as not to create high other-cell interference to UEs either that are connected to a low-power micro/pico/femto RAN node and located near the range limit of the low-power RAN node, or that are connected to a macro RAN node and located near a HeNB that does not belong to a CSG.

Nevertheless, ABS has a drawback in that radio resources are not fully used in some cells. For example in a HetNet deployment with a macro cell that is heavily loaded and a micro/pico/femto cell that has a low number of UEs located at the micro/pico/femto cell's range limit, a number of UEs connected to the macro cell will have to underutilize their radio resources so as not to interfere with the UEs in the micro/pico/femto cell. This inefficient use of radio resources can become even more pronounced if the micro/pico/femto cell UEs cannot receive DL control signaling, or they suffer high interference on the data regions of their DL signals due to cell-specific reference symbols (CRS) transmitted by the macro cell. The scenario is similar for UEs connected to macro eNBs and located near CSG HeNBs, as such UEs either cannot receive DL control signaling or suffer high interference on their data regions due to CRS transmitted by the near CSG HeNBs.

For efficient operation, LTE will require that transmissions from cells participating in ABS are time-aligned at the level of an orthogonal frequency division multiplex (OFDM) symbol. The starting OFDM symbols of transmission time intervals (TTI) either can be aligned between the macro and micro/pico/femto layers, or transmissions can be shifted in time in a multiple of OFDM symbol durations. In both cases, either the DL control channel region of the micro/pico/femto layer, or the data region, or both are going to receive strong interference by the CRS of the macro layer. Thus, whether UEs compliant with 3GPP LTE Release 11 will have to support interference cancellation of other cells' CRS is under discussion.

A number of different algorithms for setting the cell selection offset are known in the literature, which includes International Application PCT/SE2011/050604 filed on May 12, 2011, for "Methods in Base Stations, Computer Programs and Computer Program Products", and International Application PCT/EP2011/051050 filed on Jan. 26, 2011 for "A Method and a Network Node for Determining an Offset for Selection of a Cell of a First Radio Network Node".

Many algorithms for setting the cell selection offset are based on i) the ratio of the received power of reference symbols from a serving cell and a neighboring cell, which can be a micro/pico/femto cell, ii) the load on a macro cell or layer, iii) the load on a micro/pico/femto cell or layer, iv) the distances of macro base stations, etc. It seems likely, however, that such algorithms will not operate appropriately because UEs selected to be handed over to a neighbor cell, such as a micro/pico/femto base station, may not be able to operate when located at the range limit of the small cell. For example, some UEs in some cases may be taken up by a neighbor cell and be located in an extended range area of the neighbor cell without being able to receive DL control information from their serving cell.

SUMMARY

Hence there is a need for methods and apparatus that enable determining range expansion in optimal and beneficial ways for both homogeneous and heterogeneous networks.

In accordance with aspects of this invention, there is provided a method of operating a serving base station for a communication network that includes the serving base station, at least one neighbor base station, and at least one user equipment (UE) located within communication range of the serving base station and the at least one neighbor base station. The method includes transmitting, by the serving base station, at least one notification to inform the serving base station of interference cancellation capability of at least one UE and of measurements of signals received by the at least one UE from the serving base station and a neighbor base station, where the at least one notification includes a geometry threshold value for determining geometry of the at least one UE with respect to the neighbor base station; and determining, based on at least one report that includes an indication of a geometry of at least one UE with respect to the neighbor base station, whether to generate a cell selection offset parameter for extending a range of the neighbor base station.

Also in accordance with aspects of this invention, there is provided a method of operating a user equipment UE for a communication network that includes a serving base station, at least one neighbor base station, and the UE located within communication range of the serving base station and the at least one neighbor base station. The method includes receiving, by the UE, a notification to inform the serving base station of an interference cancellation capability of the UE and of measurements of signals received by the UE from the serving base station and a neighbor base station, wherein the notification includes a geometry threshold value for determining the UE's geometry with respect to the neighbor base station; and determining, based on the geometry threshold value, a geometry value that indicates the UE's geometry with respect to the neighbor base station.

Also in accordance with aspects of this invention, there is provided an arrangement in a serving base station for a communication network that includes the serving base station, at least one neighbor base station, and at least one user equipment (UE) located within communication range of the serving base station and the at least one neighbor base station. The arrangement includes a transmitter configured for sending at least one notification to inform the serving base station of interference cancellation capability of at least one UE and of measurements of signals received by the at least one UE from the serving base station and a neighbor base station, where the at least one notification includes a geometry threshold value for determining geometry of the at least one UE with respect to the neighbor base station; and an electronic processor circuit configured for determining, based on at least one report that includes an indication of geometry of the at least one UE with respect to the neighbor base station, whether to generate a cell selection offset parameter for extending a range of the neighbor base station.

Also in accordance with aspects of this invention, there is provided an arrangement in a UE for a communication network that includes a serving base station, at least one neighbor base station, and the UE located within communication range of the serving base station and the at least one neighbor base station. The arrangement includes a receiver configured for receiving a notification to inform the serving base station of an interference cancellation capability of the UE and of measurements of signals received by the UE from the serving base station and a neighbor base station, wherein the notification includes a geometry threshold value for determining the UE's geometry with respect to the neighbor base station; and an electronic processor circuit configured for determining, based on the geometry threshold value, a geometry value that indicates the UE's geometry with respect to the neighbor base station.

BRIEF DESCRIPTION OF THE DRAWINGS

The several features, objects, and advantages of this invention will become apparent by reading this description in conjunction with the drawings, in which.

DETAILED DESCRIPTION

The inventors have recognized that a UE located in an extended-range area of a cell can inform its serving base station (e.g., a macro cell, a micro/pico/femto cell, etc.) with which it communicates of the UE's capability of canceling interference from other cells' CRS or other transmissions. That capability information enables the network to decide based on more information whether range extension of a cell is beneficial for a number of UEs, and will result in more efficient radio resource utilization. The UE capability information can be exchanged via X2AP or S1 signaling to a neighbor target cell when the UE is undergoing handover, or via any kind of connecting interface between serving and target eNBs.

It will be understood that this application focusses on an LTE communication network for convenience, and that the principles of this invention can be applied in other communication networks, including WCDMA and similar networks, and in particular other communication networks that apply similar techniques of changing the range of a cell within a network. It will also be understood that this application focusses on communication networks that include base stations of different capabilities and characteristics for illustrative purposes, e.g., HetNets, and that the principles of this invention can be applied in communication networks that include base stations of similar capabilities and characteristics, i.e., homogeneous networks.

An LTE network uses OFDM in the downlink from an eNB to a UE, or terminal, in its cell, and suppressed carrier frequency division multiple access (SC-FDMA) in the uplink from a UE to an eNB. LTE communication channels are described in 3GPP Technical Specification (TS) 36.211 V9.1.0, Physical Channels and Modulation (Release 9) (December 2009) and other specifications. For example, control information exchanged by eNBs and UEs is conveyed by physical uplink control channels (PUCCHs) and by physical downlink control channels (PDCCHs).

Figure 2:
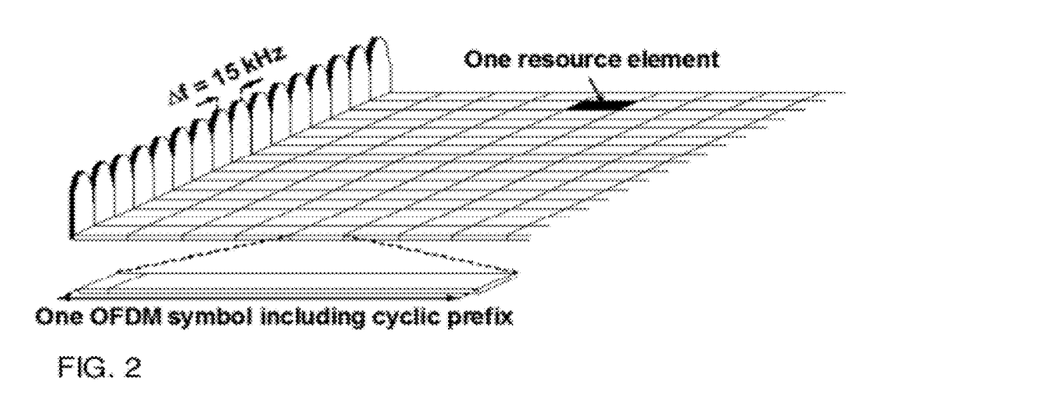
FIG. 2 depicts a downlink physical radio resource of a Long Term Evolution communication network.

FIG. 2 depicts the basic LTE DL physical resource as a time-frequency grid of resource elements (REs), in which each RE spans one OFDM subcarrier (frequency domain) for one OFDM symbol (time domain). The subcarriers, or tones, are typically spaced apart by fifteen kilohertz (kHz). In an Evolved Multicast Broadcast Multimedia Services (MBMS) Single Frequency Network (MBSFN), the subcarriers are spaced apart by either 15 kHz or 7.5 kHz. A data stream to be transmitted is portioned among a number of the subcarriers that are transmitted in parallel. Different groups of subcarriers can be used at different times for different purposes and different users.

Figure 3:
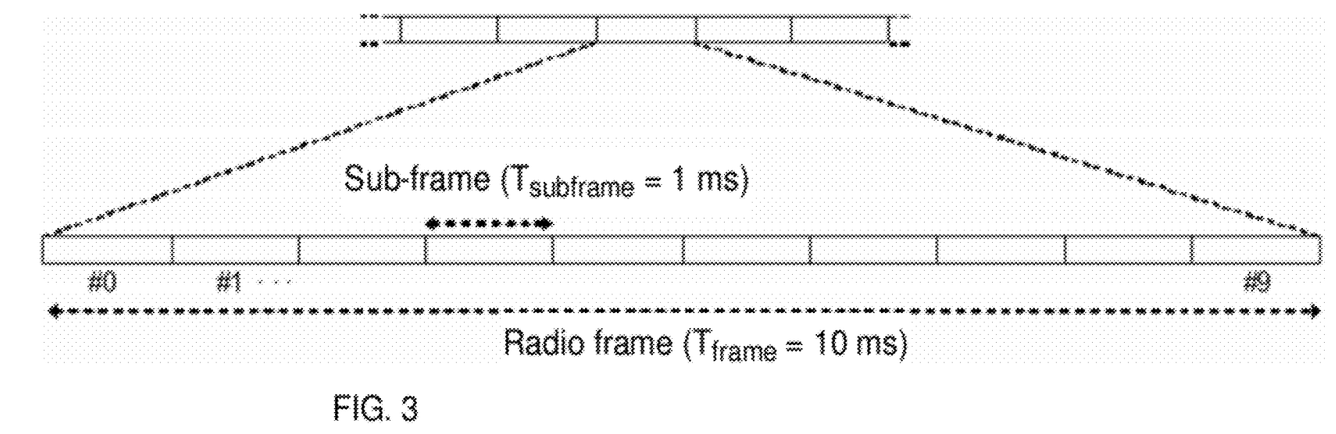
FIG. 3 depicts an organization of downlink resources in a frequency division duplex mode of a Long Term Evolution network.

FIG. 3 generally depicts the organization over time of an LTE DL OFDM carrier in the frequency division duplex (FDD) mode of LTE according to 3GPP TS 36.211. The DL OFDM carrier comprises a plurality of subcarriers within its bandwidth as depicted in FIG. 2, and is organized into successive frames of 10 milliseconds (ms) duration. Each frame is divided into ten successive subframes, and each subframe is divided into two successive time slots of 0.5-ms each. Each slot typically includes either six or seven OFDM symbols, depending on whether the symbols include long (extended) or short (normal) cyclic prefixes.

Figure 4:
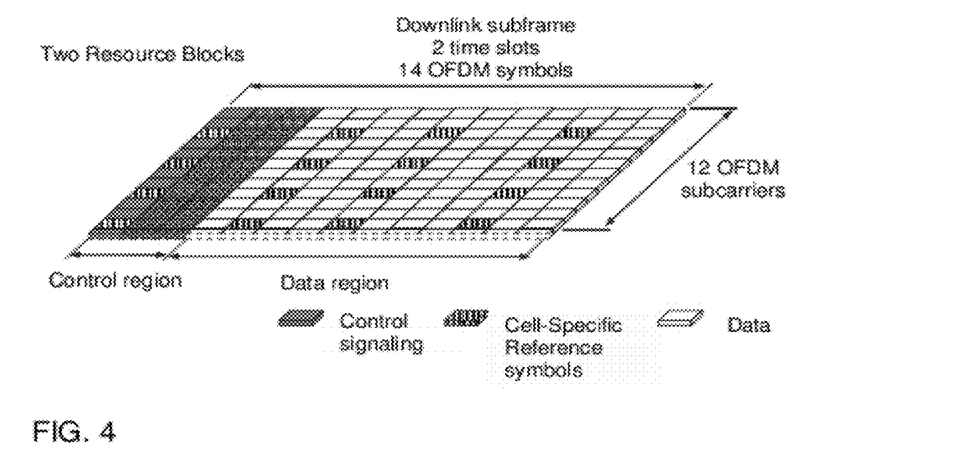
FIG. 4 depicts the downlink physical radio resource of a Long Term Evolution communication network as physical resource blocks.

FIG. 4 also generally depicts the LTE DL physical resource in terms of resource blocks (RBs), with each RB corresponding to one slot in the time domain and twelve 15-kHz subcarriers in the frequency domain. Resource blocks, which are sometimes also called physical resource blocks, are consecutively numbered within the bandwidth of an OFDM carrier, starting with 0 at one end of the system bandwidth. Two consecutive (in time) resource blocks can also sometimes be called a physical resource block, corresponding to two time slots (one subframe, or 1 ms), and such a physical resource block is the minimum radio resources allocable in an LTE communication system.

Transmissions in LTE are dynamically scheduled in each subframe, and scheduling operates on the time interval of a subframe. An eNB transmits assignments/grants to certain UEs via a PDCCH, which is carried by the first 1, 2, or 3 OFDM symbol(s) in each subframe and spans over the whole system bandwidth. That area is often called the control region. A UE that has decoded the control information carried by a PDCCH knows which resource elements in the subframe contain data aimed for the UE. In the example depicted by FIG. 4, the PDCCHs occupy just the first symbol of the first RB. In this particular case, therefore, the second and third symbols can be used for data.

The length of the control region, which can vary from subframe to subframe, is signaled to the UEs through a physical control format indicator channel (PCFICH), which is transmitted within the control region at locations known by the UEs. After a UE has decoded the PCFICH, it knows the size of the control region and in which OFDM symbol data transmission starts. Also transmitted in the control region is a physical hybrid automatic repeat request (ARQ)

indicator channel (PHICH), which carries acknowledged/ not-acknowledged (ACK/NACK) responses by an eNB to granted uplink transmission by a UE that inform the UE about whether its uplink data transmission in a previous subframe was successfully decoded by the eNB or not.

Coherent demodulation of received information requires estimation of the radio channel, which is facilitated by transmitting reference symbols (RS), i.e., symbols known by the receiver. Acquisition of channel state information (CSI) at the transmitter or the receiver is important to proper implementation of multi-antenna techniques. In LTE, an eNB transmits CRS in all DL subframes on known subcarriers in the OFDM frequency-vs.-time grid. CRS are described in, for example, Clauses 6.10 and 6.11 of 3GPP TS 36.211. A UE uses its received versions of the CRS to estimate characteristics, such as the impulse response, of its DL channel. The UE can then use the estimated channel matrix (CSI) for coherent demodulation of the received DL signal, for channel quality measurements to support link adaptation, and for other purposes. LTE also supports UE-specific reference symbols for assisting channel estimation at eNBs.

Before an LTE UE can communicate with the LTE network, i.e., with an eNB, the UE has to find and synchronize itself to a cell in the network, to receive and decode the information needed to communicate with and operate properly within the cell, and to access the cell by a so-called random-access procedure. The first of these steps, finding a cell and synchronizing to it, is commonly called cell search and cell selection, and for an LTE network is specified for example in Section 5.2 of 3GPP TS 36.304 V8.4.0, User Equipment (UE) Procedures in Idle Mode (Release 8) (December 2008).

Cell search and selection is carried out at various times, such as when a UE powers up or initially accesses a network, and is also performed in support of UE mobility. Thus, even after a UE has found and acquired a cell, which can be called its serving cell, the UE continually searches for, synchronizes to, and estimates the reception quality of signals from cells neighboring its serving cell. The reception qualities of the neighbor cells, in relation to the reception quality of the serving cell, are evaluated in order to determine whether a handover (for a UE in Connected mode) or a cell re-selection (for a UE in Idle mode) should be carried out. For a UE in Connected mode, the handover decision is taken by the network based on reports of DL signal measurements provided by the UE. Examples of such measurements are reference signal received power (RSRP) and reference signal received quality (RSRQ).

Depending on how the measurements, which can be complemented by a configurable offset, are used, the UE can be connected to different eNBs because, for example, the output power of a cell, such as a micro/pico/femto cell or a relay node can be on the order of more than 16 dB less than the output power of another cell, such as a macro cell. 3GPP TS 36.304 describes use of the cell selection offset during cell reselection when the UE is in Idle mode, and 3GPP TS 36.331 describes the cell specific offset to be used when the UE is in Connected mode. For example, Clause 5 of 3GPP TS 36.331 specifies "events" to be reported. In addition, 3GPP TS 36.133 also describes cell selection offsets, calling them an "A3-offset" in its test cases. From a downlink perspective, it is usually better to select a cell based on downlink received power, but from an uplink perspective, it is usually better to select a cell based on the path loss.

The inventors have recognized that the borders of cells, such as micro/pico/femto cells, can be effectively adjusted by adjusting the offset parameters that are used during cell selection. In that way, a cell can have an adjustable "extended range area" that extends beyond the usual borders of the cell. Furthermore as described above, a UE located in an extended range area of a cell can inform the base station (e.g., a macro cell or micro/pico/femto cell) with which it communicates of the UE's capability of canceling interference from other cells' CRS or other transmissions. That capability information enables the network to decide based on more information whether range extension of a cell will benefit a number of UEs and result in more efficient radio resource utilization.

In general, the interference cancellation capability information sent by a UE to a base station informs the base station of whether the UE can suppress or remove signals received from neighboring cells that interfere with the signals of the UE's desired serving cell, effectively increasing the signal-to-noise ratio (SNR) or signal-to-interference ratio (SIR) for the detection of the desired serving cell's signals. For example, the UE can be capable of estimating and subtracting signals it receives from neighboring (non-serving) base stations. If that is the case, the SNR or SIR of the UE's received signal from its serving base stations can be higher and the UE can be better able to detect the signals from the serving cells because interference due to neighboring cell(s) can be estimated and subtracted prior to detection. Interference cancellation techniques are described in the literature, which includes for example U.S. Pat. No. 5,680,419 to G. Bottomley for "Method of and Apparatus for Interference Rejection Combining in Multi-Antenna Digital Cellular Communication Systems" and U.S. Pat. No. 6,363,104 to G. Bottomley for "Method and Apparatus for Interference Cancellation in a Rake Receiver".

Figure 5:
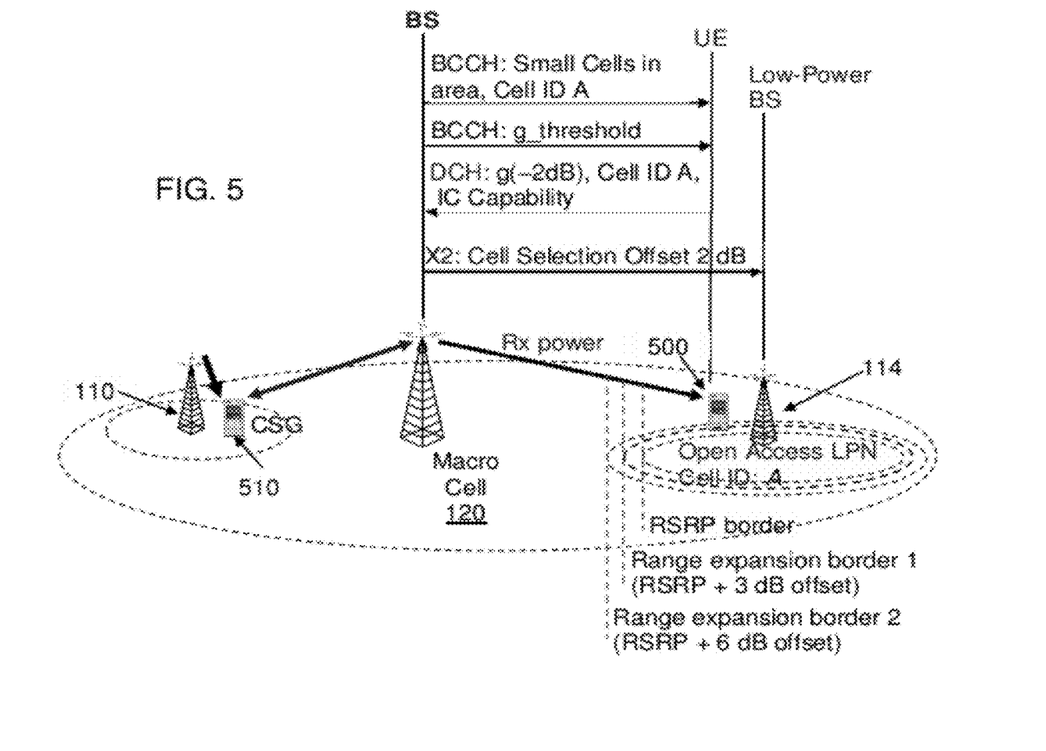
FIG. 5 depicts an example of a heterogeneous communication network in accordance with an embodiment of this invention.

FIG. 5 depicts an example of a heterogeneous communication network 100 that includes a macro cell 120, underlying low-power cells 110, 114, which can be micro, pico, femto, or relay cells, and UEs 500, 510. It will be appreciated that different arrangements of cells and UEs can be provided in homogeneous network and HetNet deployments. The low-power cell 114 is illustrated as a member of an open-access low-power network (LPN) having a cell identification (ID) A and a normal cell border corresponding to a normal RSRP level (indicated by a dashed circle, which appears as an ellipse in the perspective view in FIG. 5). In general, a cell border is a locus of points yielding the same RSRP signal level in the cell. FIG. 5 shows two extended-range borders for the low-power cell 114, a range expansion border 1 that corresponds to the normal RSRP with a 3-dB offset parameter, and a range expansion border 2 that corresponds to the normal RSRP with a 6-dB offset parameter. It will be understood, of course, that the borders depicted in FIG. 5 are not drawn to scale, and that other offset parameters have corresponding other borders.

In FIG. 5, the UE 500 is connected to the serving base station 120 and that is in a particular geometry with respect to the cell 114 with lower transmission power. This arrangement is depicted in FIG. 5 by the arrow between the macro cell 120 and the UE 500 labeled Rx power and the location of the UE 500 outside the normal border and inside the range expansion border 1 of the cell 114, which is considered a neighbor cell for the purposes of cell selection and handover.

The serving base station 120 and the UE 500 are configured to send control messages to each other and such messages are used by the UE to report its geometry with respect to the cell 114 to the serving base station 120, along with an indication of whether the UE supports interference cancellation (IC) of other-cell CRS and/or data, when the UE 500 has determined that the particular geometry exists.

As depicted in FIG. 5, the control messaging can include an information message transmitted by the base station 120 on a broadcast control channel (BCCH) or another suitable message, e.g., a dedicated Radio Resource Control (RRC) message or the like on a suitable channel. The information message indicates that neighboring cells exist, i.e., small (low-power) cells within the border of the cell 120, and also provides the ID A of the neighbor cell 114 and other neighboring cells. That or another information message transmitted by the base station 120 on the BCCH provides a geometry threshold value g_threshold for use by a UE, such as the UE 500, in determining its geometry with respect to a neighbor cell, such as the small cell 114, that is near enough to communicate with the UE.

In the case of a homogeneous network, the procedure is substantially the same as that described in the previous paragraph, and the control messaging can also be broadcast via BCCH or transmitted via dedicated RRC messages or other suitable messages. Because in a homogeneous network there is no specific neighbor to indicate to the users in a cell, those users notify the base station of their capabilities to cancel interference from neighbor cells when they are in communication range of each neighbor cell.

It will be understood that this arrangement is only an example. The UE does not need to know the Cell ID of the closest neighbor cell. The UE can simply report its IC capability upon detection of the event that the geometry to a neighbor cell is lower than a threshold. The UE participates in the control messaging by transmitting a suitable message on a dedicated control channel (DCH) that reports the cell ID A of the neighbor cell 114, an indication of the UE's geometry with respect to the cell 114, and an indication that the UE has IC capability. Based on the UE's message, the base station 120 sends one or more suitable messages to the cell 114, e.g., over an X2AP interface, and those messages include an offset parameter that adjusts the cell selection process carried out by the neighbor cell 114. The offset parameter can be equal to or the same as the parameter used by the serving base station 120 in its own cell-selection decisions. As depicted in FIG. 5, the indication of the UE's geometry is a geometry value g=−2 dB that is described in more detail below.

In an enhanced version of the method, the serving BS 120 and the neighbor BS 114 in this example can apply the cell-specific offset for cell selection only to those UEs that are capable of cancelling interference from neighbor cells. Hence, the cell selection offset does not have to be the same for all UEs in the extended cell range.

The UE's geometry can be advantageously determined by measuring the RSRP of the cell 120 and the RSRP of the neighbor cell 114 and forming their ratio. When the measured geometry to a neighbor cell with lower or equal transmission power level (hence a neighbor cell with the potential to have its range extended) is below the geometry threshold, a UE reports that event to its serving base station. Occurrence of the event can be recognized in the UE by its determining whether the following Equation 1 is satisfied:

$$\text{g\_threshold} \geq g = \frac{RSRP_{serving}}{RSRP_{neighbor}} \quad \text{Eq. (1)}$$

in which for FIG. 5 g_threshold is the geometry threshold transmitted to the UE 500 by the serving base station 120, and g is a geometry value determined by the UE 500, which is the ratio of the RSRP of the serving base station 120 measured by the UE 500 to the RSRP of the neighbor cell 114 measured by the UE 500. As depicted in FIG. 5, the UE reports a geometry value g=2 dB.

It can be noted here that the literature uses the term "geometry" to denote the ratio of the signal strength from the serving base station to the sum of signal strengths from all the neighbor cells. In this application, the term "geometry" should be understood to denote the ratio of the signal strength from the serving base station to the signal strength from a neighbor cell, such as the strongest neighbor cell, which is the ratio used for the Event A3 specified in 3GPP TS 36.331.

It will be appreciated that the UE's report message or messages can contain simply its measured geometry value and/or its measured RSRP values corresponding to its measured geometry value according to Eq. (1), besides an indication of whether the UE is capable of cancelling interference from neighbor cells' CRS and/or transmissions. It will be appreciated that if the UE's report message contains the measured RSRP values, the serving base station can itself compute the geometry value, for example according to Eq. (1).

As an alternative, a UE 500 can be configured to send a report message upon occurrence of the event described by Eq. (1) only if the UE does NOT support interference cancellation of CRS or other transmissions from other cells. A possible advantage of this alternative is that signaling overhead is reduced due to fewer event report messages.

Figure 6:
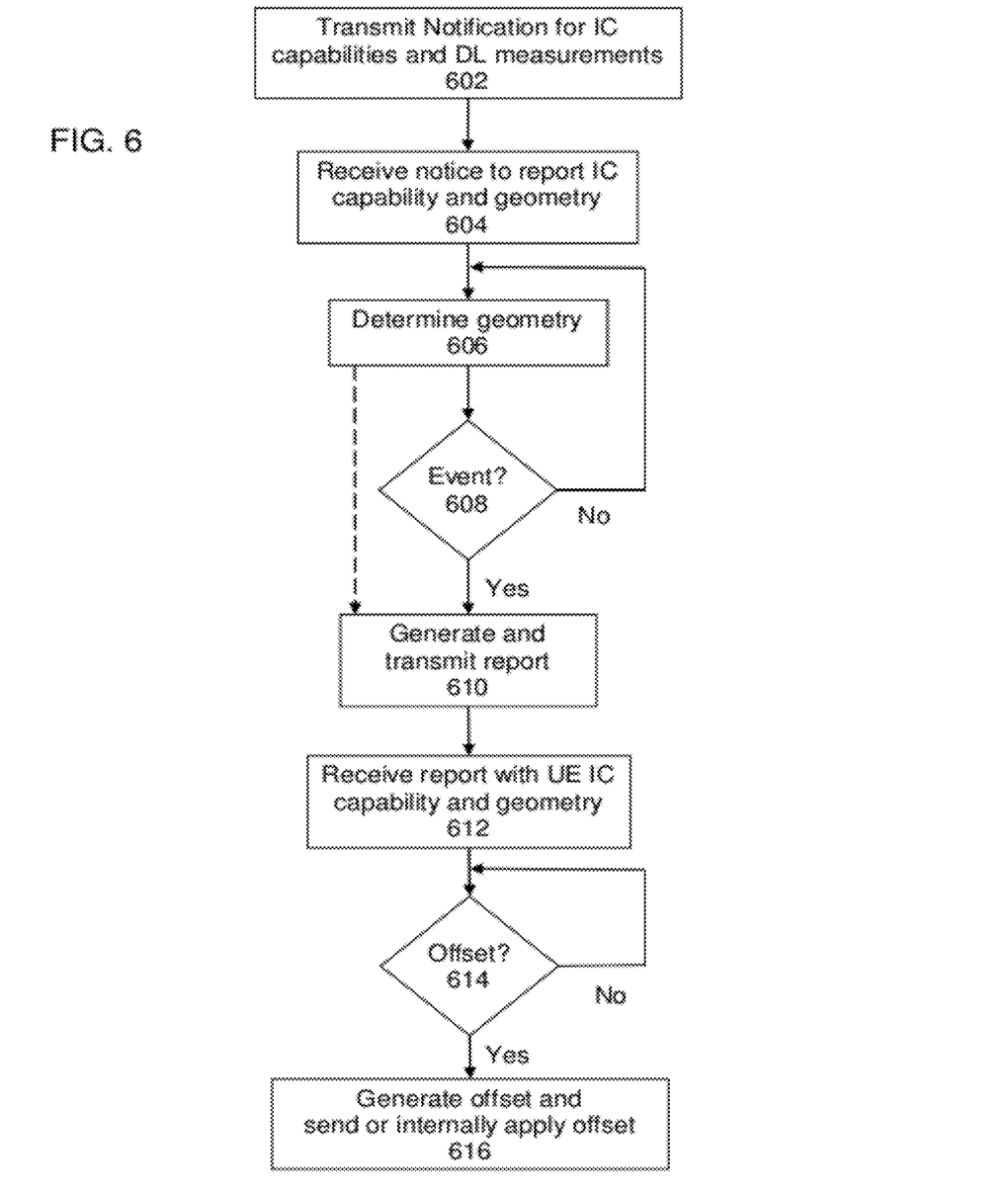
FIG. 6 is a flowchart that illustrates methods of operating a serving base station and a user equipment as depicted in FIG. 5.

FIG. 6 is a flowchart that illustrates methods of operating a serving base station and a UE for a network such as that depicted in FIG. 5. In step 602, the serving base station 120 transmits at least one notification to at least one UE within its cell that the UEs should inform the serving base station of the IC capability of the respective UEs and their DL signal measurements, e.g., the RSRP of the serving base station and RSRPs of candidate neighbor cells, which can be macro cells and/or micro/pico/femto cells. The at least one notification includes a geometry threshold value for use by a UE in determining its geometry with respect to the candidate neighbor base stations, particularly the strongest neighbor. For example, the serving base station 120 can broadcast a suitable notification on its BCCH as depicted in FIG. 5, with attention to UEs that are compliant with 3GPP Release 10 and earlier. As an alternative, the serving base station can transmit notifications about this feature by dedicated RRC signaling or by any other kind of signaling.

With respect to UEs that are compliant with 3GPP Release 10 and earlier, the feature of exchanging the terminal's capability to cancel interference from neighbor cells is not required by the specifications. Therefore, for such a UE a software upgrade can be provided that enables it to decode the information transmitted on the BCCH or to exchange the information via RRC or other signaling. For example, a Release-10 or earlier UE can be instructed to download a software upgrade that enables it to understand and decode an RRC message received from the serving base station that asks the UE to report its interference canceling capability. The software upgrade can also enable such a UE to transmit its receiver type (e.g., a type of receiver that has interference cancellation capability, or a type of receiver that does not have interference cancellation capability) in either a new message, or as an additional Information Element of an existing RRC message. In any event, a serving base station can send a UE's receiver type to a neighbor base station, and so the neighbor base station can configure its handling of the UE.

In step 604, the UE 500 receives a notification, including a geometry threshold value, to inform its serving base station 120 of the UE's IC capability and DL signal measurements, and in step 606, the UE determines its geometry with respect to at least one of the candidate neighbor cells, such as the low-power cell 114, based on its received geometry threshold value. It will be understood that in determining its geometry, the UE makes DL measurements, including RSRP measurements, of nearby cells in the course of its typical operations. As described above, the UE can determine its geometry value g according to Eq. (1). It can be noted that the candidate neighbor cells will include a strongest candidate neighbor cell, i.e., the neighbor cell that produces the strongest DL signal measurement. The UE can be configured to determine its geometry with respect to the strongest candidate neighbor cell.

The UE 500 can further determine (step 608) whether the event described by Eq. (1) has occurred. If the event has not occurred (No in step 608), the method flow returns to making new measurements as appropriate and determining whether the event has occurred. If the event has occurred (Yes in step 608), the UE generates one or more suitable report messages and transmits the report message(s) to the serving base station (step 610). As described above, the report includes an indication of whether the UE has IC capability and the geometry value that indicates the UE's geometry with respect to at least one of the candidate neighbor cells, such as the low-power base station 114.

In step 612, the serving base station 120 receives a report, such as a report transmitted by the UE 500, and in step 614 based on the report, the serving base station 120 determines whether to generate a cell selection offset parameter for the neighbor cell, such as the cell 114, identified in the report, or alternatively whether to apply internally the cell selection offset for this specific UE during cell selection without notifying the neighbor cell, thereby extending that neighbor cell's range. If the serving base station does not determine to send an offset or apply an offset internally (No in step 614), the method flow returns to waiting for a report from a UE. If the serving base station does determine to send or apply an offset (Yes in step 614), the serving base station generates (step 616) the cell selection offset and either sends the offset over an interface, such as the X2AP or S1 interface, between the cells or applies the cell selection offset internally for cell selection.

Figure 7:
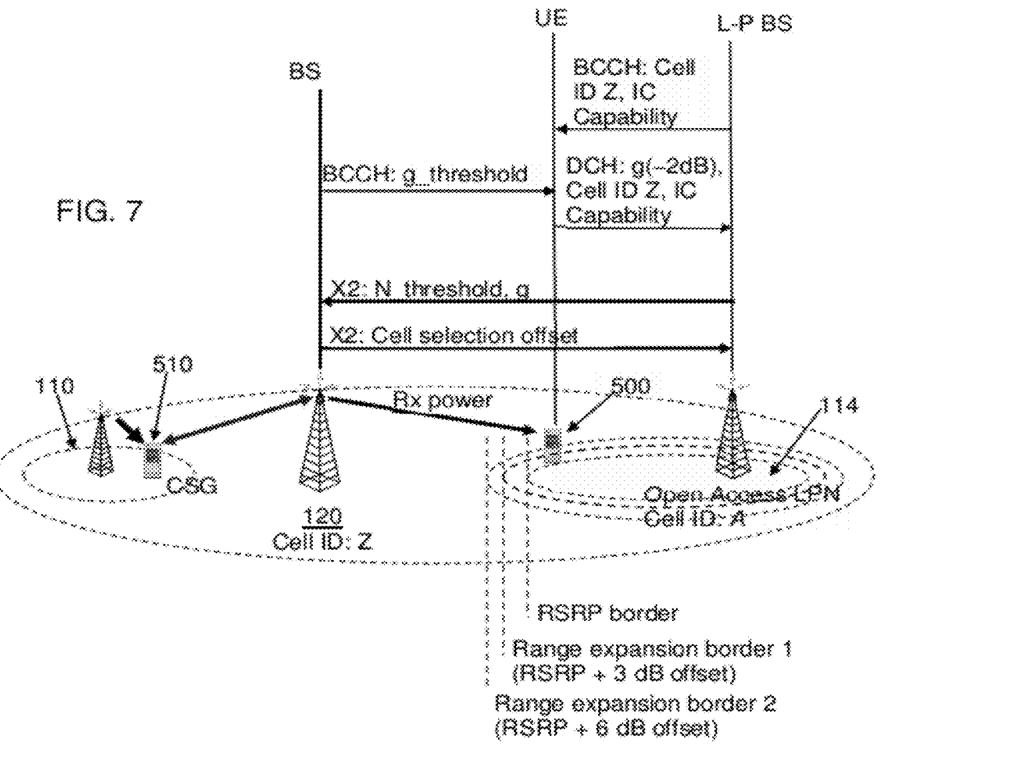
FIG. 7 depicts an example of a heterogeneous communication network that illustrates how a macro base station can use knowledge of interference cancellation capabilities and geometries of user equipments.

FIG. 7 depicts an example of a heterogeneous communication network that illustrates in more detail how the macro base station 120 can use knowledge of UEs' IC capabilities and geometries with respect to low-power cells e.g., steps 614 and 616 in FIG. 6. As in FIG. 5, the network 100 includes a macro cell 120, underlying low-power cells 110, 114, which can be micro, pico, femto, or relay cells, and UEs 500, 510, and it will be appreciated that different arrangements of cells and UEs can be provided.

As described above, a serving base station, such as the cell 120, becomes aware of the existence of a UE, such as the UE 500, and possibly other UEs in an extended coverage area of a neighbor cell, such as the small cell 114, and based on reports from the UEs that indicate the UEs' respective IC capabilities, the serving base station becomes aware of those respective IC capabilities. Based on that information and other measurements, such as the respective loads in the serving and neighbor cells, the serving base station can determine whether to extend the range of the neighbor cell and to what extent.

For example, consider a case in which the macro cell 120 is fully loaded and the small cell 114 is mildly loaded. In this case, it is of interest to the operator to reduce the load of the macro cell 120. Thus, the cell selection offset parameter can be set to a value such that the range of the small cell 114 is extended significantly. For another example, consider a case in which the macro cell 120 is lightly loaded. In that case, the cell selection offset for handover decisions between cells 120 and 114 can be set to a value such that the cell range of the small cell 114 is not extended.

For a further example, assume that at a given time instant, the base station 120 is aware of 10 UEs having respective geometry values $0 \text{ dB} \geq g \geq -4 \text{ dB}$ with respect to the cell 114, 11 UEs having respective geometry values $0 \text{ dB} \geq g \geq -7 \text{ dB}$ with respect to the cell 114, and 16 UEs having respective geometry values $0 \text{ dB} \geq g \geq -9 \text{ dB}$ with respect to the cell 114. Assume also that the base station 120 is aware that none of those 37 UEs has IC capability. It will be appreciated that these assumed conditions can occur as the result of carrying out steps 602-610 depicted in FIG. 6 and described above.

The serving base station 120 uses that knowledge in deciding to apply range expansion to the cell 114. For the assumed conditions, the serving base station 120 can decide to generate and send a cell selection offset value of 3 dB to the cell 114. The base station 120 chooses that offset value because if it chose a larger value, e.g., an offset value higher than about 4 dB or 5 dB, many of the UEs located within such a larger extended range of the cell 114 would not be able to communicate due to their lack of IC capability. The UEs would not be able to handle the interference they would experience primarily from CRS and secondarily from data portions of transmissions in the cell 120. It can be noted that the setting of the offset value to 3 dB is based on the typically high likelihood that UEs with this geometry are experiencing an SINR near that value. This means that the SINR in the PDCCH is likely to be near −3 dB, which can be expected to be higher than the minimum SINR required to decode the PDCCH without errors. It can further be noted that this example is a case in which the cell selection offset is set to the same value for the whole cell. An alternative is to set a respective cell selection offset value for each UE, depending on each UE's capability to cancel other-cell interference.

As depicted in FIG. 7, the serving base station 120, low-power (neighbor) base station 114, and UE 500 are configured to send control messages to each other. As described above in connection with FIG. 5, the control messaging can include one or more information messages transmitted by the base station 120 on its BCCH or other suitable channel that indicate that low-power cells exist within the border of the cell 120, that provide the IDs of such cells, and that provide a geometry threshold value g_threshold for use by a UE, such as the UE 500, in determining its geometry with respect to a neighbor cell, such as the cell 114.

The UE 500 can participate in the control messaging as described above in connection with FIG. 5, but can also participate as depicted in FIG. 7 by receiving one or more information messages transmitted by the (serving) base station 114 on its own BCCH or other suitable channel that provide the cell ID of the (neighbor) cell 120 and that request the UE 500 to indicate its IC capability. In response, the UE can transmit a suitable message on a DCH to the cell 114 that reports the cell ID Z of the cell 120, the UE's geometry value g=−2 dB, and an indication that the UE has IC capability. The base station 114 sends one or more suitable messages to the cell 120 over an X2AP interface or other suitable interface between the cells, and those messages include the UE's geometry value g and a threshold number N_threshold of UEs that are within an extended range border of the cell 114 and that do not have IC capabilities. The base station 120 sends one or more suitable messages to the cell 114, e.g., over their X2AP interface or another suitable interface, and those messages include an offset parameter that adjusts the cell selection process carried out in the cell 114. It will be understood that the base stations 114, 120 can communicate via X2AP signaling or any other communication interface between the base stations.

In a HetNet as depicted in FIG. 7, the base station 114 reports to the base station 120 when a number N of UEs that do not have IC capability, that is greater than the threshold N_Threshold, and that are located within the extended range of the cell 114. Based on the report, the serving base station 120 can determine whether to adjust the range extension of the cell 114. In a manner similar to the arrangement depicted in FIG. 5, UEs in the cell 114 are aware of the cell ID of the cell 120.

A UE can use any of several RRC messages or information elements (IEs) for reporting its CRS and/or other IC capability. RRC messaging in an LTE network is specified in 3GPP TS 36.331 V10.0.0 (December 2010), Evolved Universal Terrestrial Radio Access (E-UTRA); Radio Resource Control (RRC); Protocol specification (Release 10), among other specifications. For example, a UE can use the RRC protocol message UECapabilityInformation to inform the network of its IC capabilities. That message is described in Section 6.2.2 of 3GPP TS 36.331 and includes an IE called UECapabilityInformation-r8, which specifies UE capabilities for UEs compliant with 3GPP Release-8 and later, and an IE called Critical Extensions. Those or other suitable IEs and messages can be used by a UE to report its CRS IC capability to a base station.

Information on the IC capability of a UE is advantageously transmitted to neighbor target cells during an otherwise conventional hand-over procedure according to applicable specifications for LTE or other networks. Hence, a source base station in an LTE network can send the X2AP message HO Request described in Section 9.1.1 of 3GPP TS 36.423 to a hand-over target base station, and that message can include the UE's IC capability information in an existing IE or in a new IE. In a similar way, information on the IC capability of a UE can be conveyed in any suitable HO request message that can be transmitted via other interfaces connecting the target and source BSs, such as the S1AP-protocol interface and equivalent interfaces.

With this invention, radio resources are more efficiently utilized in a communication network, such as a homogeneous network and/or a HetNet, in comparison to a network employing ABS without knowing how many users can operate in the extended range of a neighbor cell, such as a micro/pico/femto cell, where resources are wasted at the layer where they are applied, such as a macro layer. For example, a UE that does not support IC and that operates at the extended range of a micro/pico/femto cell could be forced into radio link failure (RLF) without this invention. Methods and apparatus in accordance with this invention can flexibly set range expansion levels within neighbor cells, such as low-power cells, while still efficiently using radio resources.

Figure 8A:
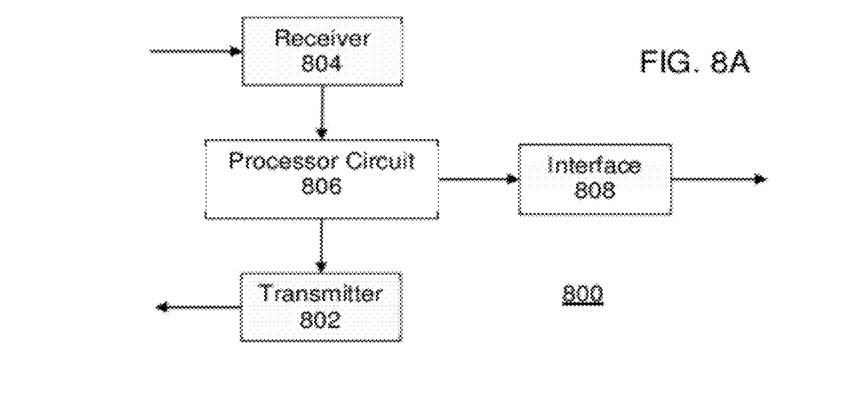
FIG. 8A is a block diagram of an arrangement in a serving base station for a communication network.

FIG. 8A is a block diagram of an example of an arrangement 800 in a serving base station for a communication network that includes the serving base station, at least one neighbor base station, and at least one UE located within range of the serving base station and the neighbor base station. As described above, either or both of the serving base station and neighbor base station can be a macro cell, such as the cell 120, or a micro/pico/femto cell, such as the cells 110, 112, 114.

As depicted in FIG. 8A, the arrangement includes a transmitter 802 configured for sending at least one notification to inform the serving base station of an interference cancellation capability of the at least one UE and of measurements of signals received by the at least one UE from the serving base station and the neighbor base station. The at least one notification includes a geometry threshold value for determining geometry of at least one UE with respect to the neighbor base station. The arrangement 800 also includes a receiver 804 configured for receiving at least one report, which can be report(s) transmitted by at least one UE, that includes an indication of a geometry of the at least one UE with respect to the neighbor base station. The arrangement 800 also includes an electronic processor circuit 806 configured for determining, based on at least one report, whether to generate and whether to send a cell selection offset parameter for extending a range of the neighbor base station. The strongest neighbor can apply the cell selection offset parameter either for all UEs or only for UEs able to cancel other-cell interference.

As described above, the transmitter 802 can be configured to transmit a notification as a message on a BCCH, and the measurements can include DL signal measurements, such as RSRPs, of the serving base station and the neighbor base station.

The arrangement 800 also includes an interface 808 configured for sending the cell selection offset parameter to a neighbor cell, including the strongest neighbor cell, such as a macro or low-power base station. For example, the interface 808 can be configured for sending the cell selection offset parameter as at least one message according to an X2AP protocol or another suitable protocol.

As described above, the electronic processor circuit 806 can be configured to determine to send the cell selection offset based on a plurality of reports, which can be from a respective plurality of UEs within range of the serving base station 120 and the neighbor base station 114. For example, the processor circuit 806 can determine to send the cell selection offset based on a report received from the neighbor base station that a number of UEs that do not have interference cancellation capability is greater than the threshold and are located within an extended range area of the low-power base station, and such a determination can be made when the selection offset parameter is to be applied to all of the number of UEs.

Figure 8B:
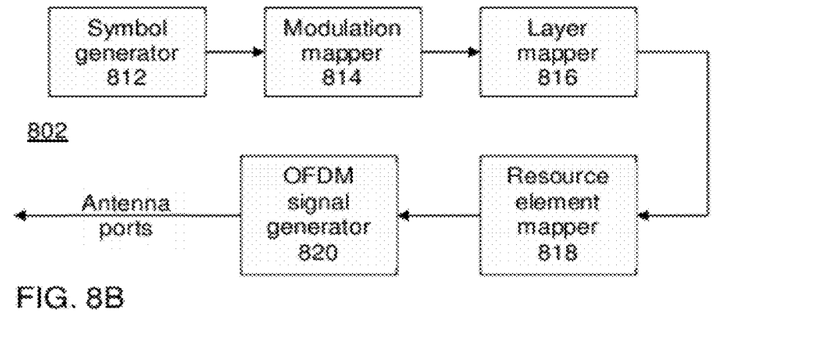
FIG. 8B is a block diagram of a portion of a transmitter for a serving base station.

FIG. 8B is a block diagram of the transmitter 802 for an eNB or other transmitting node of an LTE communication network as described above. Several parts of such a transmitter are known and described for example in Clauses 6.3 and 6.4 of 3GPP TS 36.211. Suitable signals having symbols are produced by a suitable generator 812 and provided to a modulation mapper 814 that produces complex-valued modulation symbols. A layer mapper 816 maps the modulation symbols onto one or more transmission layers, which generally correspond to antenna ports of the eNB. An RE mapper 818 maps modulation symbols for each antenna port onto respective REs and thus forms successions of RBs, subframes, and frames, and an OFDM signal generator 820 produces one or more complex-valued time-domain OFDM signals for eventual transmission.

It will be appreciated that the functional blocks depicted in FIGS. 8A, 8B can be combined and re-arranged in a variety of equivalent ways, and that many of the functions can be performed by one or more suitably programmed digital signal processors. Moreover, connections among and information provided or exchanged by the functional blocks can be altered in various ways to enable a device to implement the methods described above and other methods involved in the operation of the device in a digital communication system.

Figure 9:
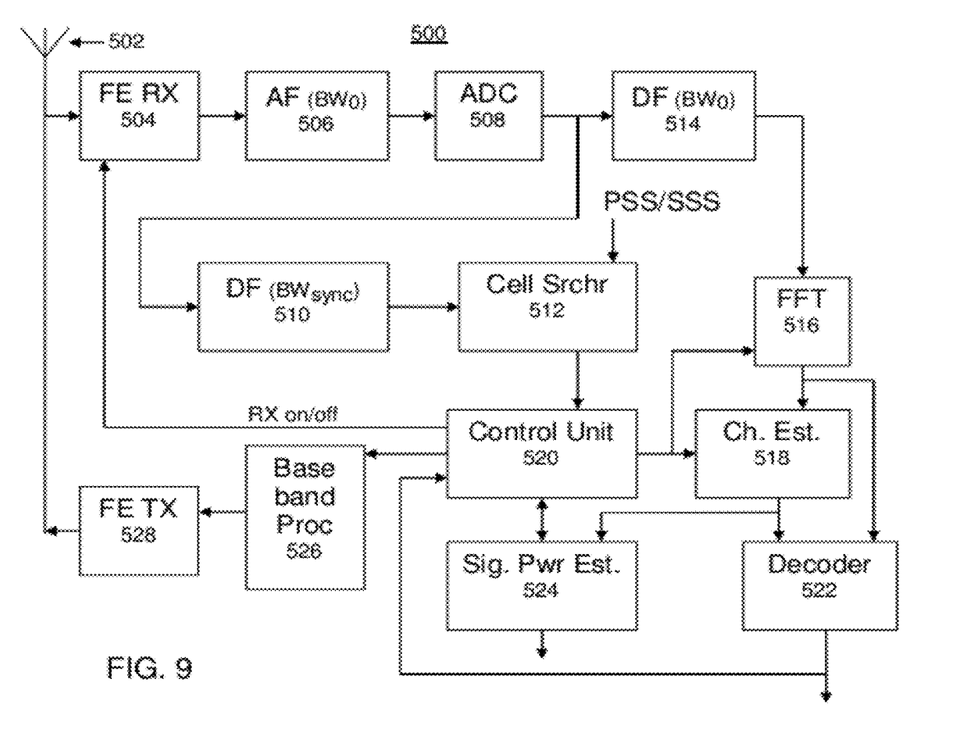
FIG. 9 is a block diagram of an arrangement in a user equipment for a communication network.

FIG. 9 is a block diagram of an arrangement 500 in a UE that can implement the methods described above. It will be appreciated that the functional blocks depicted in FIG. 9 can be combined and re-arranged in a variety of equivalent ways, and that many of the functions can be performed by one or more suitably programmed digital signal processors. Moreover, connections among and information provided or exchanged by the functional blocks depicted in FIG. 9 can be altered in various ways to enable a UE to implement other methods involved in the operation of the UE.

As depicted in FIG. 9, a UE receives a DL radio signal through an antenna 502 and typically down-converts the received radio signal to an analog baseband signal in a front end receiver (Fe RX) 504. The baseband signal is spectrally shaped by an analog filter 506 that has a bandwidth $BW_0$, and the shaped baseband signal generated by the filter 506 is converted from analog to digital form by an analog-to-digital converter (ADC) 508.

The digitized baseband signal is further spectrally shaped by a digital filter 510 that has a bandwidth $BW_{sync}$, which corresponds to the bandwidth of synchronization signals or symbols included in the DL signal. The shaped signal generated by the filter 510 is provided to a cell search unit 512 that carries out one or more methods of searching for cells as specified for the particular communication network, e.g., LTE. Typically, such methods involve detecting predetermined primary and/or secondary synchronization channel (P/S-SCH) signals in the received signal.

The digitized baseband signal is also provided by the ADC 508 to a digital filter 514 that has the bandwidth $BW_0$, and the filtered digital baseband signal is provided to a processor 516 that implements a fast Fourier transform (FFT) or other suitable algorithm that generates a frequency-domain (spectral) representation of the baseband signal. A channel estimation unit 518 receives signals from the processor 516 and generates a channel estimate $H_{i,j}$ for each of several subcarriers i and cells j based on control and timing signals provided by a control unit 520, which also provides such control and timing information to the processor 516.

The estimator 518 provides the channel estimates $H_i$ to a decoder 522 and a signal power estimation unit 524. The decoder 522, which also receives signals from the processor 516, is suitably configured to extract information from RRC or other messages as described above and typically generates signals subject to further processing in the UE (not shown). The estimator 524 generates received signal measurements (e.g., estimates of RSRP, received subcarrier power, signal to interference ratio (SIR), etc.). The estimator 524 can generate estimates of RSRP, RSRQ, received signal strength indicator (RSSI), received subcarrier power, SIR, and other relevant measurements, in various ways in response to control signals provided by the control unit 520. Power estimates generated by the estimator 524 are typically used in further signal processing in the UE.

The estimator 524 (or the searcher 512, for that matter) is configured to include a suitable signal correlator for handling reference and other signals.

The UE 500 also includes a baseband message processor 526 and a front-end transmitter (FE TX) 528 that together generate and up-convert messages and other signals transmitted by the UE through the antenna 502 under the control of the control unit 520. For example, the FE TX 528 can transmit an indication of the interference cancellation capability of the UE and the geometry value on a dedicated control channel, and the indication and the geometry value can be transmitted if the geometry value is less than a geometry threshold transmitted to the UE 500 by the serving base station 120.

In the arrangement depicted in FIG. 9, the control unit 520 keeps track of substantially everything needed to configure the searcher 512, processor 516, estimation unit 518, estimator 524, and other components. Those devices can thus be configured for receiving notifications to inform the serving base station of an interference cancellation capability of the UE and of measurements of signals received by the UE from the serving base station and one or more neighbor base stations, such as micro/pico/femto cells, and a geometry threshold value for use by the UE in determining its geometry with respect to a neighbor base station. For the estimation unit 518, this includes both method and cell ID (e.g., for reference signal extraction and cell-specific scrambling of reference signals). Communication between the searcher 512 and the control unit 520 includes cell ID and, for example, cyclic prefix configuration.

The control unit 520, which typically can include a correlator or implement a correlator function, can also be configured to receive information signaled by eNBs 120, 114, 112. As described above, the control unit 520 can include an electronic processor circuit configured for determining, based on the geometry threshold value, a geometry value that indicates the UE's geometry with respect to a neighbor base station. For example, the control unit 520 can determine the geometry value according to Eq. (1).

The control unit and other blocks of the UE can be implemented by one or more suitably programmed electronic processors, collections of logic gates, etc. that processes information stored in one or more memories. The stored information can include program instructions and data that enable the control unit to implement the methods described above. It will be appreciated that the control unit typically includes timers, etc. that facilitate its operations.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

It will be appreciated that procedures described above are carried out repetitively as necessary, for example, to respond to the time-varying nature of communication channels between transmitters and receivers. In addition, it will be understood that the methods and apparatus described here can be implemented in various system nodes.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method of operating a serving base station for a communication network that includes the serving base station, a neighbor base station, and one or more user equipments, UEs, located within communication ranges of the serving base station and of the neighbor base station, the method comprising:
   transmitting, by the serving base station, at least one notification to the one or more UEs, the at least one notification requesting the one or more UEs to provide information to the serving base station, the information comprising an UE's interference cancellation capability and a UE's geometry value, respectively; and
   determining, based on the information received from at least one of the one or more UEs, whether to extend a communication range of the neighbor base station by generating a cell selection offset parameter,
   wherein the UE's geometry value is a ratio of measured reference signal received powers received by a UE from the serving base station and from the neighbor base station, respectively.

2. The method of claim 1, further comprising sending, by the serving base station, the cell selection offset to the neighbor base station.

3. The method of claim 1, wherein the serving base station transmits the at least one notification by transmitting a message on a broadcast control channel.

4. The method of claim 1, wherein the at least one notification includes a geometry threshold value usable by the one or more UEs to report to the base station about the interference cancellation capability thereof and the geometry value, only if the UE's geometry value is less than the geometry threshold value.

5. The method of claim 1, wherein the cell selection offset parameter is generated if a number of UEs that do not have interference cancellation capability and are located within an extended communication range of the neighbor base station when the selection offset parameter is to be applied is greater than an N-threshold value.

6. The method of claim 2, wherein the serving base station sends the cell selection offset as at least one message according to either an X2 application protocol or an S1 application protocol.

7. A method of operating a user equipment, UE, in a communication network that includes a serving base station and a neighbor base station, the UE being located within communication ranges of the serving base station and of the neighbor base station, the method comprising:
   receiving, by the UE, a notification requesting the UE to inform the serving base station about an interference cancellation capability of the UE and a geometry value of the UE; and
   determining the geometry value based on measurements of signals received from the serving base station and from the neighbor base station.

8. The method of claim 7, wherein the UE determines the geometry value, g, according to:

$$g = \frac{RSRP_{serving}}{RSRP_{neighbor}}$$

in which $RSRP_{serving}$ is a measured reference signal received power from the serving base station, and $RSRP_{neighbor}$ is a measured reference signal received power from the neighbor base station.

9. The method of claim 7, further comprising transmitting an indication of the interference cancellation capability of the UE and the geometry value on a dedicated control channel.

10. The method of claim 9, wherein the indication and the geometry value are transmitted if the geometry value is less than a geometry threshold value included in the notification.

11. An arrangement in a serving base station for a communication network that includes the serving base station, a neighbor base station, and one or more user equipments, UEs, located within communication ranges of the serving base station and of the neighbor base station, the arrangement comprising:
   a transmitter configured to send at least one notification to the one or more of the UEs requesting the one or more UEs to provide information to the serving base station, the information comprising an UE's interference cancellation capability and a UE's geometry value; and
   an electronic processor circuit configured to determine, based on the received information, whether to extend a communication range of the neighbor base station by generating a cell selection offset parameter, wherein the UE's geometry value is a ratio of measured reference signal received powers, RSRP, received by a UE from the serving base station and from the neighbor base station, respectively.

12. The arrangement of claim 11, further comprising:
an interface configured to send the cell selection offset parameter to the neighbor base station.

13. The arrangement of claim 11, wherein the transmitter is configured to send the at least one notification as at least one message on a broadcast control channel or on a dedicated signaling channel.

14. The arrangement of claim 11, wherein the notification includes a geometry threshold value usable by the one or more UEs to report to the base station about the interference cancellation capability thereof and the geometry value, only if the determined geometry value exceeds the geometry threshold value.

15. The arrangement of claim 11, wherein the electronic processor circuit generates the cell selection offset parameter if a number of UEs that do not have interference cancellation capability and are located within an extended range area of the neighbor base station when the selection offset parameter is to be applied is greater than an N-threshold value.

16. The arrangement of claim 12, wherein the interface sends the cell selection offset parameter as at least one message according to an X2 application protocol or an S1 application protocol.

17. The arrangement of claim 12, wherein the interface is further configured to send a receiver type of a UE to be handed over to the neighbor base station as at least one message according to an X2 application protocol or an S1 application protocol.

18. An arrangement in a user equipment, UE, for a communication network that includes a serving base station and a neighbor base station, the UE being located such as to detect signals from the serving base station and from the neighbor base station, the arrangement comprising:

a receiver configured
to receive a notification requesting the UE to inform the serving base station about an interference cancellation capability of the UE and about a geometry value of the UE, and to measure signals received from the serving base station and from the neighbor base station;

an electronic processor circuit configured to determine the geometry value based on measurements of the signals received from the serving base station and from the neighbor base station; and a transmitter configured to transmit, information about the interference cancellation capability of the UE and the geometry value, to the serving base station, wherein the communication network uses the information to decide whether extending range of the neighbor base station is beneficial for the UE and enhances radio resource utilization efficiency, wherein the UE's geometry value is a ratio of measured reference signal received powers, RSRP, received by a UE from the serving base station and from the neighbor base station, respectively.

19. The arrangement of claim 18, wherein the electronic processor circuit determines the geometry value, g, according to:

$$g = \frac{RSRP_{serving}}{RSRP_{neighbor}}$$

in which $RSRP_{serving}$ is a measured reference signal received power received from the serving base station, and $RSRP_{neighbor}$ is a measured reference signal received power received from the neighbor base station.

20. The arrangement of claim 19, further comprising a transmitter configured to transmit an indication of the interference cancellation capability of the UE and the geometry value on a dedicated control channel.

21. The arrangement of claim 20, wherein the transmitter transmits the indication and the geometry value if the geometry value is less than a geometry threshold value included in the notification.

* * * * *

UNITED STATES PATENT AND TRADEMARK OFFICE
CERTIFICATE OF CORRECTION

PATENT NO.        : 9,451,515 B2                                    Page 1 of 1
APPLICATION NO.   : 13/457237
DATED             : September 20, 2016
INVENTOR(S)       : Dimou et al.

It is certified that error appears in the above-identified patent and that said Letters Patent is hereby corrected as shown below:

In the Specification

Column 1, Line 33, delete ""pica"" and insert -- "pico" --, therefor.

Column 6, Line 67, delete "hybrid automatic repeat request (ARQ)" and insert -- hybrid automatic repeat request (HARQ) --, therefor.

In the Claims

Column 20, Lines 14-18, Claim 18, delete "efficiency, wherein the UE's geometry value is a ratio of measured reference signal received powers, RSRP, received by a UE from the serving base station and from the neighbor base station, respectively." and insert -- efficiency. --, therefor.

Signed and Sealed this
Third Day of January, 2017

Michelle K. Lee
*Director of the United States Patent and Trademark Office*